(12) United States Patent
Hayashi et al.

(10) Patent No.: US 11,470,302 B2
(45) Date of Patent: Oct. 11, 2022

(54) THREE-DIMENSIONAL DISPLAY DEVICE, HEAD-UP DISPLAY SYSTEM, MOVING OBJECT, AND NON-TRANSITORY COMPUTER-READABLE MEDIUM STORING PROGRAM

(71) Applicant: KYOCERA Corporation, Kyoto (JP)

(72) Inventors: Yusuke Hayashi, Kunitachi (JP); Kaoru Kusafuka, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/290,818

(22) PCT Filed: Oct. 30, 2019

(86) PCT No.: PCT/JP2019/042643
§ 371 (c)(1),
(2) Date: May 3, 2021

(87) PCT Pub. No.: WO2020/095801
PCT Pub. Date: May 14, 2020

(65) Prior Publication Data
US 2021/0377513 A1     Dec. 2, 2021

(30) Foreign Application Priority Data
Nov. 5, 2018     (JP) .............................. JP2018-208331

(51) Int. Cl.
*H04N 13/327*     (2018.01)
*H04N 13/383*     (2018.01)
(Continued)

(52) U.S. Cl.
CPC .......... *H04N 13/327* (2018.05); *B60K 35/00* (2013.01); *H04N 13/31* (2018.05); *H04N 13/383* (2018.05);
(Continued)

(58) Field of Classification Search
CPC .... H04N 13/327; H04N 13/31; H04N 13/383; H04N 9/3138; H04N 9/3194;
(Continued)

(56) References Cited

U.S. PATENT DOCUMENTS 6,970,290 B1    11/2005  Mashitani et al.
9,460,665 B2 *  10/2016  Jiang ...................... G02B 1/005
(Continued)

FOREIGN PATENT DOCUMENTS

JP    2001-166259 A    6/2001

OTHER PUBLICATIONS

Christian Nitschke et al.; "Display-camera calibration using eye reflections and geometry constraints," Computer Vision and Image Understanding; vol. 115, No. 6; Feb. 25, 2011; pp. 835-853; Elsevier.

*Primary Examiner* — Tung T Vo
(74) *Attorney, Agent, or Firm* — Studebaker & Brackett PC

(57) ABSTRACT

A three-dimensional display device includes a display panel, a controller, and a communication unit. The display panel is configured to display an image. An optical element is configured to define a propagation direction of image light emitted from the display panel. The communication unit is configured to receive a captured image of first eye and second eye different from the first eye, of a user. The controller causes the display panel to display a calibration image. The controller is configured so that, based on cornea images of different parts of the calibration image in the captured image that are viewed with the first eye and the second eye of the user, respectively, a parallax image is displayed on the display panel.

6 Claims, 14 Drawing Sheets

(51) Int. Cl.
  *H04N 13/31* (2018.01)
  *B60K 35/00* (2006.01)
(52) U.S. Cl.
  CPC  *B60K 2370/149* (2019.05); *B60K 2370/1529* (2019.05)
(58) Field of Classification Search
  CPC .... H04N 13/125; H04N 13/366; B60K 35/00; B60K 2370/149; B60K 2370/1529; G02B 27/01; G02B 30/00; G03B 35/18
  USPC ......................................................... 348/51
  See application file for complete search history.

(56) References Cited

U.S. PATENT DOCUMENTS

| | | | |
|---|---|---|---|
| 10,725,302 B1* | 7/2020 | Sharma | G06F 3/0346 |
| 2011/0285700 A1* | 11/2011 | Kim | G02B 30/30 |
| | | | 345/419 |
| 2014/0043323 A1* | 2/2014 | Sumi | G02B 30/31 |
| | | | 345/419 |
| 2014/0139647 A1* | 5/2014 | Nagatani | G06F 21/83 |
| | | | 348/51 |
| 2015/0379701 A1* | 12/2015 | Borner | G01C 21/165 |
| | | | 348/47 |
| 2016/0139422 A1* | 5/2016 | Sumi | G02B 30/28 |
| | | | 349/15 |
| 2016/0150223 A1 | 5/2016 | Hwang et al. | |
| 2018/0114298 A1* | 4/2018 | Malaika | G06F 3/013 |
| 2021/0055547 A1* | 2/2021 | Rao | G09G 3/3208 |
| 2021/0211628 A1* | 7/2021 | Lu | H04N 13/322 |

* cited by examiner

FIG. 2

| P1 | P2 | P3 | P4 | P5 | P6 | P7 | P8 | P9 | P10 P11 P12 |
|---|---|---|---|---|---|---|---|---|---|
| P12 | P1 | P2 | P3 | P4 | P5 | P6 | P7 | P8 | P9 P10 P11 |
| P11 P12 | P1 | P2 | P3 | P4 | P5 | P6 | P7 | P8 | P9 P10 |
| P10 P11 | P12 | P1 | P2 | P3 | P4 | P5 | P6 | P7 | P8 P9 |
| P9 P10 | P11 | P12 | P1 | P2 | P3 | P4 | P5 | P6 | P7 P8 |
| P8 P9 | P10 | P11 | P12 | P1 | P2 | P3 | P4 | P5 | P6 P7 |
| P7 P8 | P9 | P10 | P11 | P12 | P1 | P2 | P3 | P4 | P5 P6 |
| P6 P7 | P8 | P9 | P10 | P11 | P12 | P1 | P2 | P3 | P4 P5 |
| P5 P6 | P7 | P8 | P9 | P10 | P11 | P12 | P1 | P2 | P3 P4 |
| P4 P5 | P6 | P7 | P8 | P9 | P10 | P11 | P12 | P1 | P2 P3 |
| P3 P4 | P5 | P6 | P7 | P8 | P9 | P10 | P11 | P12 | P1 P2 |
| P2 P3 | P4 | P5 | P6 | P7 | P8 | P9 | P10 | P11 | P12 P1 |
| P1 P2 | P3 | P4 | P5 | P6 | P7 | P8 | P9 | P10 | P11 P12 |
| P12 P1 | P2 | P3 | P4 | P5 | P6 | P7 | P8 | P9 | P10 P11 |
| P11 P12 | P1 | P2 | P3 | P4 | P5 | P6 | P7 | P8 | P9 P10 |
| P10 P11 | P12 | P1 | P2 | P3 | P4 | P5 | P6 | P7 | P8 P9 |

IMAGE OF RIGHT EYE

IMAGE OF WHITE IMAGE    IMAGE OF BLACK IMAGE

IMAGE OF LEFT EYE

IMAGE OF WHITE IMAGE    IMAGE OF BLACK IMAGE

IMAGE OF RIGHT EYE

IMAGE OF BLACK IMAGE

IMAGE OF LEFT EYE

IMAGE OF WHITE IMAGE

IMAGE OF RIGHT EYE

IMAGE OF WHITE IMAGE    IMAGE OF BLACK IMAGE

IMAGE OF LEFT EYE

IMAGE OF WHITE IMAGE    IMAGE OF BLACK IMAGE

IMAGE OF RIGHT EYE

IMAGE OF BLACK IMAGE

IMAGE OF LEFT EYE

IMAGE OF WHITE IMAGE

THREE-DIMENSIONAL DISPLAY DEVICE, HEAD-UP DISPLAY SYSTEM, MOVING OBJECT, AND NON-TRANSITORY COMPUTER-READABLE MEDIUM STORING PROGRAM

CROSS-REFERENCE TO RELATED APPLICATION

This application claims priority to Japanese Patent Application No. 2018-208331, which was filed on Nov. 5, 2018, the contents of which are incorporated herein by reference in its entirety.

TECHNICAL FIELD

The present disclosure relates to a three-dimensional display device, a head-up display system, a moving object, and a program.

BACKGROUND

In a related art, in order to carry out three-dimensional display without using glasses, a three-dimensional display device including an optical element that allows a part of the light emitted from the display panel to reach a right eye and the other part of the light emitted from the display panel to reach a left eye is known (see Patent Literature 1).

CITATION LIST

Patent Literature

Patent Literature 1: Japanese Unexamined Patent Publication JP-A 2001-166259

SUMMARY

A three-dimensional display device of the disclosure includes a display panel, an optical element, a controller, and a communication unit. The display panel is configured to display an image. The optical element is configured to define a propagation direction of image light emitted from the display panel. The controller is configured to control an image which is to be displayed on the display panel. The communication unit is configured to receive a captured image of first eye and second eye different from the first eye, of a user. The controller is configured so that a calibration image is displayed on the display panel. The controller is configured so that, based on cornea images of different parts of the calibration image in the captured image that are viewed with the first eye and the second eye of the user, respectively, a first display subpixel on the display panel that is visible with the first eye is determined and a second display subpixel on the display panel that is visible with the second eye is determined.

A three-dimensional display device of the disclosure includes a display panel, an optical element, a controller, and a communication unit. The display panel is configured to display an image. The optical element is configured to define a propagation direction of image light emitted from the display panel. The controller is configured to control an image which is to be displayed on the display panel. The communication unit is configured to receive a captured image of first eye and second eye different from the first eye, of a user. When a pattern of display positions on the display panel of an image that is to be viewed with the first eye and an image that is to be viewed with the second eye, is defined as a calibration pattern, the controller is configured so that a plurality of calibration patterns are displayed on the display panel. The controller is configured so that, based on cornea images of different parts of each of the calibration patterns in the captured image that are viewed with the first eye and the second eye of the user, respectively, a reference pattern as a reference for displaying a three-dimensional image from the plurality of calibration patterns is determined.

A head-up display system of the disclosure includes a three-dimensional display device and an optical member. The three-dimensional display device includes a display panel, an optical element, a controller, and a communication unit. The display panel is configured to display an image. The optical element is configured to define a propagation direction of image light emitted from the display panel. The controller is configured to control an image which is to be displayed on the display panel. The communication unit is configured to receive a captured image of first eye and second eye different from the first eye, of a user. The controller is configured so that a calibration image is displayed on the display panel. The controller is configured so that, based on cornea images of different parts of the calibration image in the captured image that are viewed with the first eye and the second eye of the user, respectively, a first display subpixel on the display panel that is visible with the first eye is determined and a second display subpixel on the display panel that is visible with the second eye is determined. The optical member is configured to reflect the image light emitted from the three-dimensional display device, toward the first eye or the second eye.

A head-up display system of the disclosure includes a three-dimensional display device and an optical member. The three-dimensional display device includes a display panel, an optical element, a controller, and a communication unit. The display panel is configured to display an image. The optical element is configured to define a propagation direction of image light emitted from the display panel. The controller is configured to control an image which is to be displayed on the display panel. The communication unit is configured to receive a captured image of first eye and second eye different from the first eye, of a user. When a pattern of display positions on the display panel of an image that is to be viewed with the first eye and an image that is to be viewed with the second eye, is defined as a calibration pattern, the controller is configured so that a plurality of calibration patterns are displayed on the display panel. The controller is configured so that, based on cornea images of different parts of each of the calibration patterns in the captured image that are viewed with the first eye and the second eye of the user, respectively, a reference pattern as a reference for displaying a three-dimensional image from the plurality of calibration patterns is determined.

A moving object of the disclosure includes a head-up display system. The head-up display system includes a three-dimensional display device and an optical member. The three-dimensional display device includes a display panel, an optical element, a controller, and a communication unit. The display panel is configured to display an image. The optical element is configured to define a propagation direction of image light emitted from the display panel. The controller is configured to control an image which is to be displayed on the display panel. The communication unit is configured to receive a captured image of first eye and second eye different from the first eye, of a user. The controller is configured so that a calibration image is displayed on the display panel. The controller is configured so that, based on cornea images of different parts of the calibration image in the captured image that are viewed with the first eye and the second eye of the user, respectively, a first display subpixel on the display panel that is visible with the first eye is determined and a second display subpixel on the display panel that is visible with the second eye is determined. The optical member is configured to reflect the image light emitted from the three-dimensional display device, toward the first eye or the second eye.

A moving object of the disclosure includes a head-up display system. The head-up display system includes a three-dimensional display device and an optical member. The three-dimensional display device includes a display panel, an optical element, a controller, and a communication unit. The display panel is configured to display an image. The optical element is configured to define a propagation direction of image light emitted from the display panel. The controller is configured to control an image which is to be displayed on the display panel. The communication unit is configured to receive a captured image of first eye and second eye different from the first eye, of a user. When a pattern of display positions on the display panel of an image that is to be viewed with the first eye and an image that is to be viewed with the second eye, is defined as a calibration pattern, the controller is configured so that a plurality of calibration patterns are displayed on the display panel. The controller is configured so that, based on cornea images of different parts of each of the calibration patterns in the captured image that are viewed with the first eye and the second eye of the user, respectively, a reference pattern as a reference for displaying a three-dimensional image from the plurality of calibration patterns is determined.

A program of the disclosure is a program executed by a three-dimensional display device including a display panel, an optical element, a controller, and a communication unit. The display panel is configured to display an image. The optical element is configured to define a propagation direction of image light emitted from the display panel. The controller is configured to control an image which is to be displayed on the display panel. The communication unit is configured to receive a captured image of first eye and second eye different from the first eye, of a user. The program is a program for the controller causing the display panel to display a calibration image. Based on cornea images of different parts of the calibration image in the captured image that are viewed with the first eye and the second eye of the user, respectively, the controller determines a first display subpixel on the display panel that is visible with the first eye and determines a second display subpixel on the display panel that is visible with the second eye.

A program of the disclosure is a program executed by a three-dimensional display device including a display panel, an optical element, a controller, and a communication unit. The display panel is configured to display an image. The optical element is configured to define a propagation direction of image light emitted from the display panel. The controller is configured to control an image which is to be displayed on the display panel. The communication unit is configured to receive a captured image of first eye and second eye different from the first eye, of a user. When a pattern of display positions on the display panel of an image that is to be viewed with the first eye and an image that is to be viewed with the second eye, is defined as a calibration pattern, the controller causes the display panel to display a plurality of calibration patterns. Based on cornea images of different parts of each of the calibration patterns in the captured image that are viewed with the first eye and the second eye of the user, respectively, the controller determines a reference pattern as a reference for displaying a three-dimensional image from the plurality of calibration patterns.

BRIEF DESCRIPTION OF DRAWINGS

FIG. 2 is a diagram illustrating an example of a display panel illustrated in FIG. 1 viewed from a depth direction;

DETAILED DESCRIPTION

In order for a user to properly view an image projected by a three-dimensional display device, it is desired that image light appropriately reaches the position of eyes of a user.

The disclosure provides a three-dimensional display device, a head-up display system, a moving object, and a program that are able to make a user view an appropriate three-dimensional image.

Hereinafter, embodiments of the disclosure will be described with reference to drawings. The figures used in the following description are schematic, and the dimensional ratios and the like on the drawings do not always match actual ones.

First Embodiment

Figure 1:
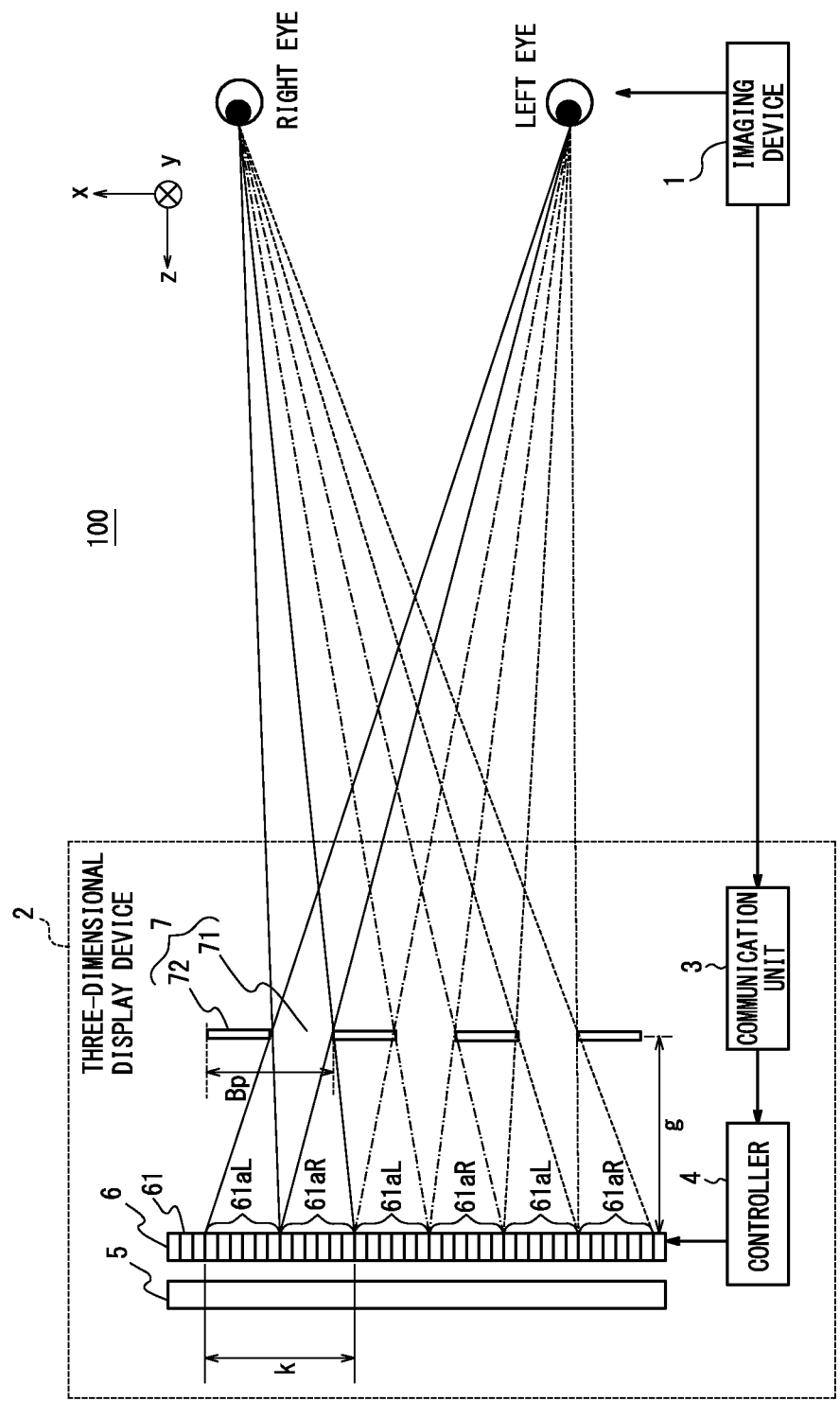
FIG. 1 is a diagram illustrating a schematic configuration of a three-dimensional display system of a first embodiment.

As illustrated in FIG. 1, a three-dimensional display system 100 according to a first embodiment of the disclosure includes an imaging device 1 and a three-dimensional display device 2.

The imaging device 1 is placed so that both eyes of a user are included in an image capturing range. The imaging device 1 can be attached to an arbitrary position where the image of both eyes of the user can be captured. In the case where the three-dimensional display system 100 is attached to a moving object 20, for example, the imaging device 1 may be attached to a rearview mirror of the moving object 20. The imaging device 1 may be attached to an instrument panel of the moving object 20, for example, in a cluster. The imaging device 1 may be attached to a center panel. The imaging device 1 may be attached to a support portion of a steering wheel.

The imaging device 1 may include, for example, a CCD (Charge Coupled Device) imaging element or a CMOS (Complementary Metal Oxide Semiconductor) imaging element. The imaging device 1 is configured to generate an image by capturing an image of the user seated in the moving object 20. The imaging device 1 is configured to transmit the generated image to the three-dimensional display device 2.

As illustrated in FIG. 1, the three-dimensional display device 2 can include a communication unit 3, a controller 4, an irradiator 5, a display panel 6, and a parallax barrier 7 as an optical element.

The communication unit 3 can communicate with the imaging device 1. The communication method used in the communication with the imaging device 1 by the communication unit 3 may be a wireless communication standard, a wireless communication standard for connecting to a mobile telephone network, a wireless communication standard, or a wired communication standard. The short-range wireless communication standard may include, for example, Wi-Fi (registered trademark), Bluetooth (registered trademark), infrared rays, NFC (Near Field Communication), and the like. The wireless communication standard for connecting to the mobile telephone network may include, for example, LTE (Long Term Evolution), fourth-generation mobile communication systems, fifth-generation mobile communication systems, and the like.

The communication unit 3 is configured to receive an image generated by the imaging device 1 from the imaging device 1.

The controller 4 is connected to each component of the three-dimensional display device 2 to control each component. The components controlled by the controller 4 include the communication unit 3 and the display panel 6. The controller 4 is configured as, for example, a processor. The controller 4 may include one or more processors. The processor may include a general-purpose processor that loads a specific program and executes a specific function, and a dedicated processor specialized for a specific type of processing. The dedicated processor may include an application specific integrated circuit (ASIC). The processor may include a programmable logic device (PLD). The PLD may include an FPGA (Field-Programmable Gate Array). The controller 4 may be either a SoC (System-on-a-Chip) or a SiP (System In a Package) in which one or more processors cooperate.

The controller 4 is configured to carry out various kinds of processing based on an image captured by the imaging device 1 and received by the communication unit 3. The details of the processing of the controller 4 will be described later.

The irradiator 5 is configured to be able to planarly irradiate the display panel 6. The irradiator 5 may include a light source, a light guide plate, a diffusion plate, a diffusion sheet, and the like. The irradiator 5 is configured to emit irradiation light from the light source and to homogenize the irradiation light in the plane direction of the display panel 6 by the light guide plate, the diffusion plate, the diffusion sheet, or the like. Then, the irradiator 5 can emit the homogenized light toward the display panel 6.

As the display panel 6, a display panel such as a transmissive liquid crystal display panel may be adopted. The display panel 6 is not limited to the transmissive liquid crystal panel, and other display panels such as organic EL can be used. In the case where a self-luminous display panel is used as the display panel 6, the three-dimensional display device 2 does not need to include the irradiator 5. The display panel 6 will be described as a liquid crystal panel.

As illustrated in FIG. 2, the display panel 6 includes a plurality of divided regions on an active area 61 formed in a planar shape. The active area 61 can display a parallax image. The parallax image includes a left-eye image (first image) and a right-eye image (second image) having parallax with respect to the left-eye image. The left-eye image is an image that is to be viewed with a left eye (first eye) of the user. The right-eye image is an image that is to be viewed with the right eye (second eye) of the user. A divided region is a region divided in a first direction and a second direction that intersects the first direction. A direction orthogonal to the first and second directions is referred to as a third direction. The first direction may be referred to as a horizontal direction. The second direction may be referred to as a vertical direction. The third direction may be referred to as a depth direction. However, the first direction, the second direction, and the third direction are not limited thereto, respectively. In the drawing, the first direction is represented as an x-axis direction, the second direction is represented as a y-axis direction, and the third direction is represented as a z-axis direction.

Each divided region corresponds to one subpixel. Therefore, the active area 61 includes a plurality of subpixels arranged in a grid along the horizontal and vertical directions.

Each subpixel corresponds to any color of R (Red), G (Green), B (Blue), and one pixel can be formed of three subpixels of R, G, and B as a set. One pixel can be referred to as one picture element. The display panel 6 is not limited to the transmissive liquid crystal panel, and other display panels such as organic EL can be used. In the case where a self-luminous display panel is used as the display panel 6, the three-dimensional display device 2 does not need to include the irradiator 5.

The plurality of subpixels arranged in the active area 61 as mentioned above constitute a subpixel group Pg. The subpixel groups Pg are repeatedly arranged in the horizontal direction. The subpixel groups Pg can be arranged at the same position in the vertical direction and can be arranged to be shifted. For example, the subpixel groups Pg can be repeatedly arranged in the vertical direction to be adjacent to positions shifted by one subpixel in the horizontal direction. The subpixel group Pg includes subpixels in predetermined rows and columns. For example, the subpixel group Pg includes (2×n×b) subpixels P1 to P(2×n×b) in which b subpixels (b rows) in the vertical direction and 2×n (2×n columns) subpixels in the horizontal direction are continuously arranged. In the example illustrated in FIG. 3, n=6 and b=1. In the active area 61, the subpixel group Pg including twelve subpixels P1 to P12 in which one subpixel in the vertical direction and twelve subpixels in the horizontal direction are continuously arranged is disposed. In the example illustrated in FIG. 3, reference numerals are given to some subpixel group Pg.

The subpixel group Pg is a minimum unit in which the controller 4 described below carries out control to display an image. The subpixels included in the subpixel group Pg are identified with identification information P1 to P(2×n×b). The subpixels P1 to P(2×n×b) that have the same identification information of the whole subpixel group Pg are controlled substantially simultaneously by the controller 4. For example, in the case where an image displayed at the subpixel P1 is switched from a left-eye image to a right-eye image, the controller 4 simultaneously switches the image displayed at the subpixel P1 in the whole subpixel group Pg from the left-eye image to the right-eye image.

As illustrated in FIG. 1, the parallax barrier 7 is formed in a planar shape along the active area 61, and is disposed away by a predetermined distance (gap) g from the active area 61. The parallax barrier 7 may be positioned on an opposite side of the irradiator 5 with respect to the display panel 6. The parallax barrier 7 may be positioned on the irradiator 5-side with respect to the display panel 6.

Figure 3:
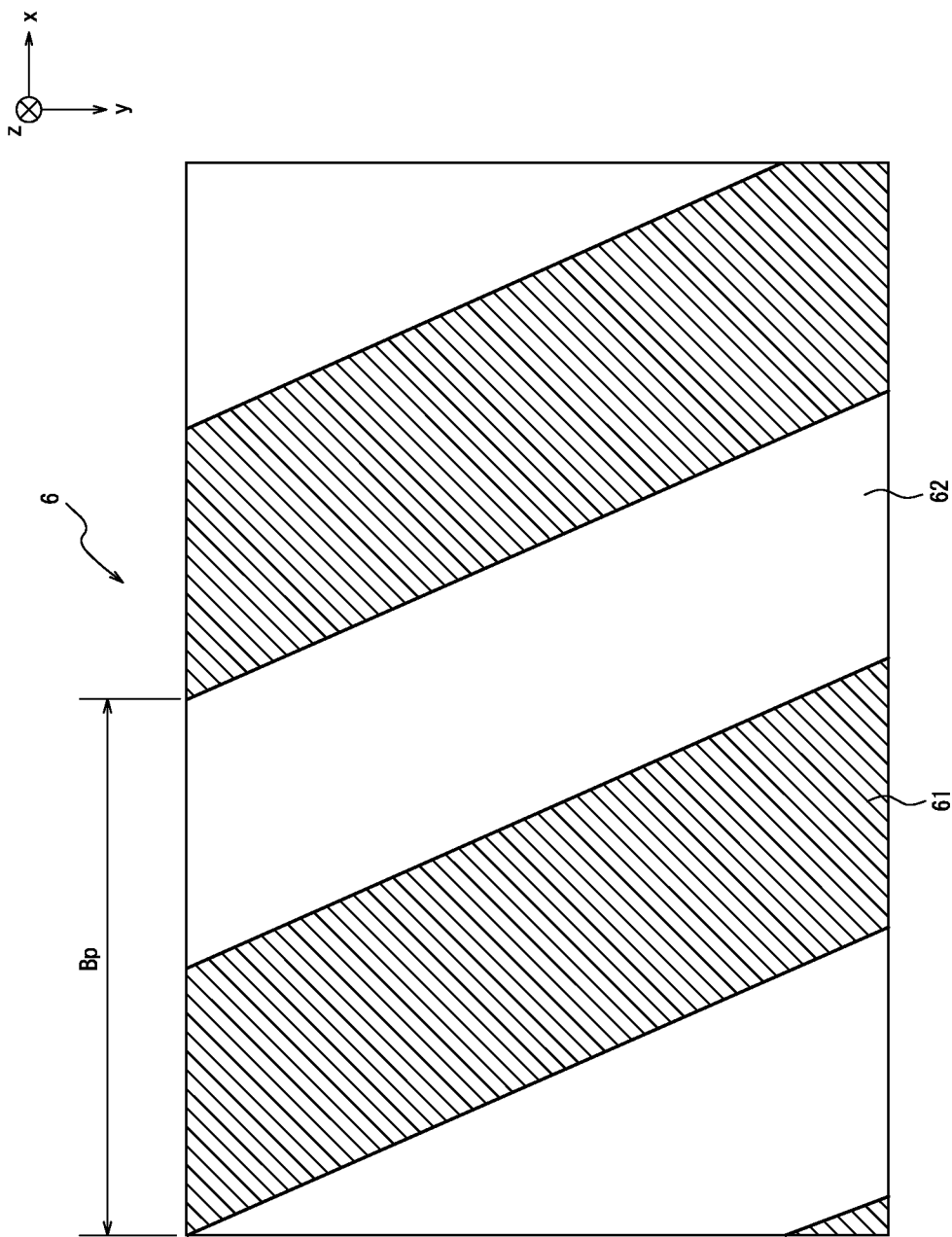
FIG. 3 is a diagram illustrating an example of a parallax barrier illustrated in FIG. 1 viewed from the depth direction.

As illustrated in FIG. 3, the parallax barrier 7 is configured to define a propagation direction of the image light emitted from the subpixels for each of light-transmitting regions 71 which are a plurality of strip regions extending in a predetermined direction in the plane. Specifically, the parallax barrier 7 includes a plurality of dimming regions 72 in which the image light is dimmed. The plurality of dimming regions 72 partition the light-transmitting regions 71 between the adjacent dimming regions 72. The light-transmitting region 71 has higher light transmittance than that of the dimming region 72. The dimming region 72 has lower light transmittance than that of the light-transmitting region 71. The light-transmitting region 71 and the dimming region 72 extend in a predetermined direction along the active area 61 and are alternately arranged repeatedly in a direction perpendicular to the predetermined direction. The predetermined direction is, for example, a direction along a diagonal line of the subpixels. The predetermined direction can be set to a direction which crosses b subpixels in the second direction while crossing a subpixels in the first direction (where a and b are positive relatively prime integers). The predetermined direction may be the second direction.

By defining the propagation direction of the image light emitted from the subpixels arranged in an active area 61, the parallax barrier 7 is configured to transmit the image light emitted from a part of the subpixels of the active area 61 through the light-transmitting regions 71 and propagate the image light to the left eye of the user. The parallax barrier 7 is configured to propagate the image light emitted from some other subpixels of the active area 61 through the light-transmitting regions 71 and propagate the image light to the right eye of the user.

As illustrated in FIG. 1, the region of the active area 61 that is visible with each eye of the user is determined based on the characteristics of the three-dimensional display device 2 and the position of the eyes of the user. The characteristics of the three-dimensional display device 2 are the gap g, an image pitch k, which is the horizontal length of the subpixel group Pg, and a barrier pitch Bp, which is the sum of the horizontal lengths of the light-transmitting region 71 and the dimming region 72. Hereinafter, the region of the active area 61 that can be viewed with the left eye by the image light being propagated to the position of the left eye of the user is referred to as a left visible region 61aL (first visible region). The region of the active area 61 that can be viewed with the right eye by the image light being propagated to the position of the right eye of the user is referred to as a right visible region 61aR (second visible region).

Here, the controller 4 of the three-dimensional display device 2 will be described in detail.

Figure 4:
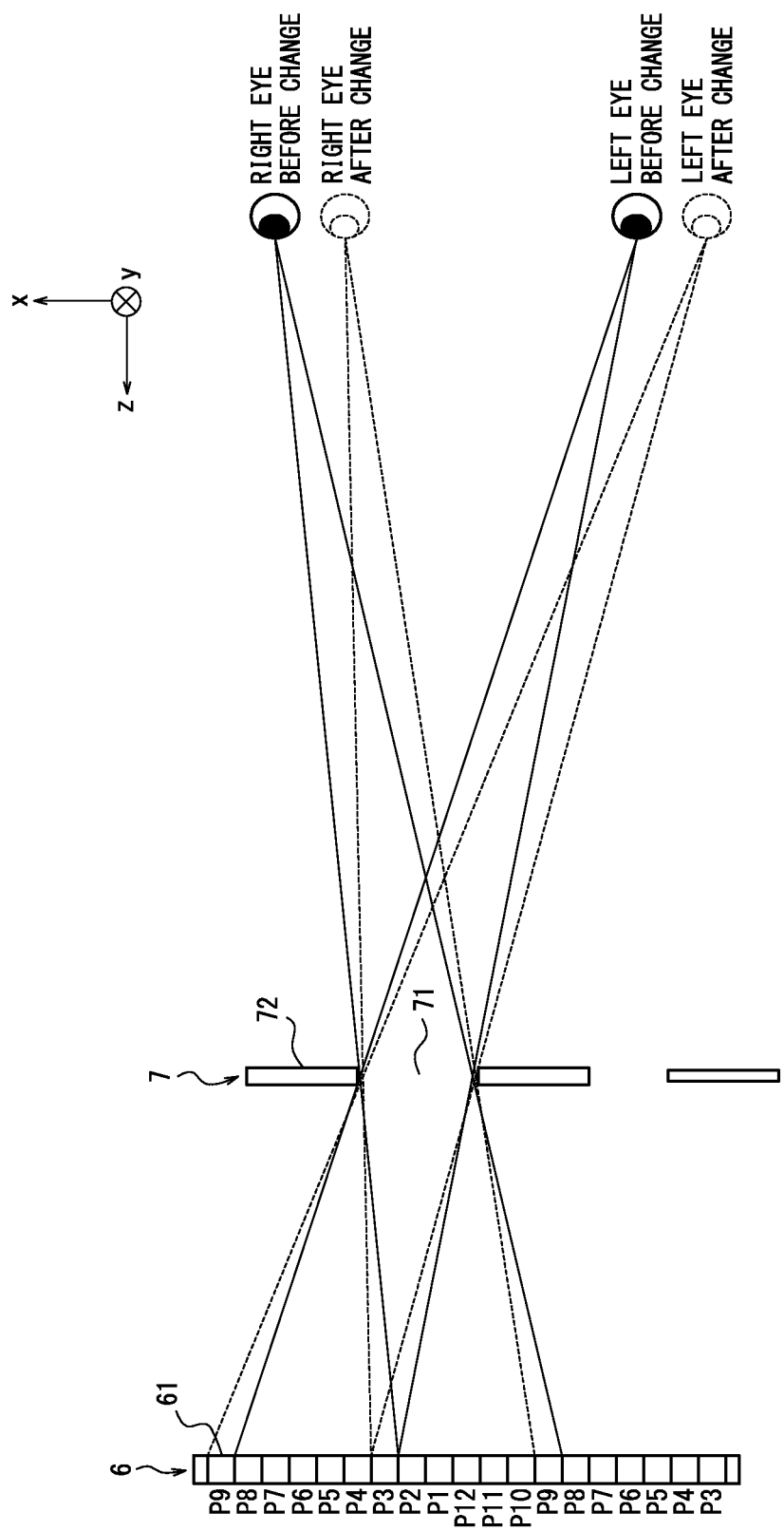
FIG. 4 is a diagram illustrating subpixels that are visible according to the position of eyes.

The left visible region 61aL and the right visible region 61aR change according to the position of the eyes of the user. In the example illustrated in FIG. 4, before the change of the position of the eyes, the subpixels P3 to P8 are the left visible region 61aL, and the subpixels P9 to P12, P1, and P2 are the right visible region 61aR. After the change of the position of the eyes, the subpixels P4 to P9 are the left visible region 61aL, and the subpixels P10 to 12 and P1 to P3 are the right visible region 61aR.

Therefore, before the change, when the controller 4 causes the subpixels P3 to P8 to display the left-eye image and causes the subpixels P9 to P12, P1, and P2 to display the right-eye image, the user can view a three-dimensional image with the least crosstalk. However, when, after the position of the eyes is changed in the horizontal direction, the controller 4 carries out control such that the left-eye image and the right-eye image are displayed on the display panel 6 in the same manner as before the change, the left eye views more of the right-eye image, and the right eye views more of the left-eye image than before the change. As a result, crosstalk increases, and it is difficult for the user to properly view the three-dimensional image. Therefore, the controller 4 needs to determine a left display subpixel (first display subpixel) that is visible with the left eye and a right display subpixel (second display subpixel) that is visible with the right eye so that the occurrence of crosstalk is reduced even after the position of the eyes is changed.

To this end, the controller 4 causes each subpixel of the display panel 6 to display a calibration image in a calibration mode. The controller 4 causes the display panel 6 to display a parallax image in a normal mode, based on the cornea image in the captured image generated by the imaging device 1 when the calibration image is displayed. Hereinafter, the details of the processing of the controller 4 in each of the calibration mode and the normal mode will be described.

Calibration Mode

In the calibration mode, the controller 4 causes the display panel 6 to display a calibration pattern. Specifically, the controller 4 causes the display panel 6 to display one of the (2×n) types of calibration patterns. The calibration pattern is a pattern of display positions on the display panel 6 of a first calibration image that is to be viewed with the left eye and a second calibration image that is to be viewed with the right eye. The first calibration image may be, for example, a white image whose brightness is higher than a predetermined value close to the maximum brightness (for example, brightness 250 at 256 gradations) and is indicated by "W" in the drawing. The second calibration image may be, for example, a black image whose brightness is lower than a predetermined value close to the minimum brightness (for example, brightness 10 at 256 gradations) and is indicated by "BL" in the drawing.

Figure 5:
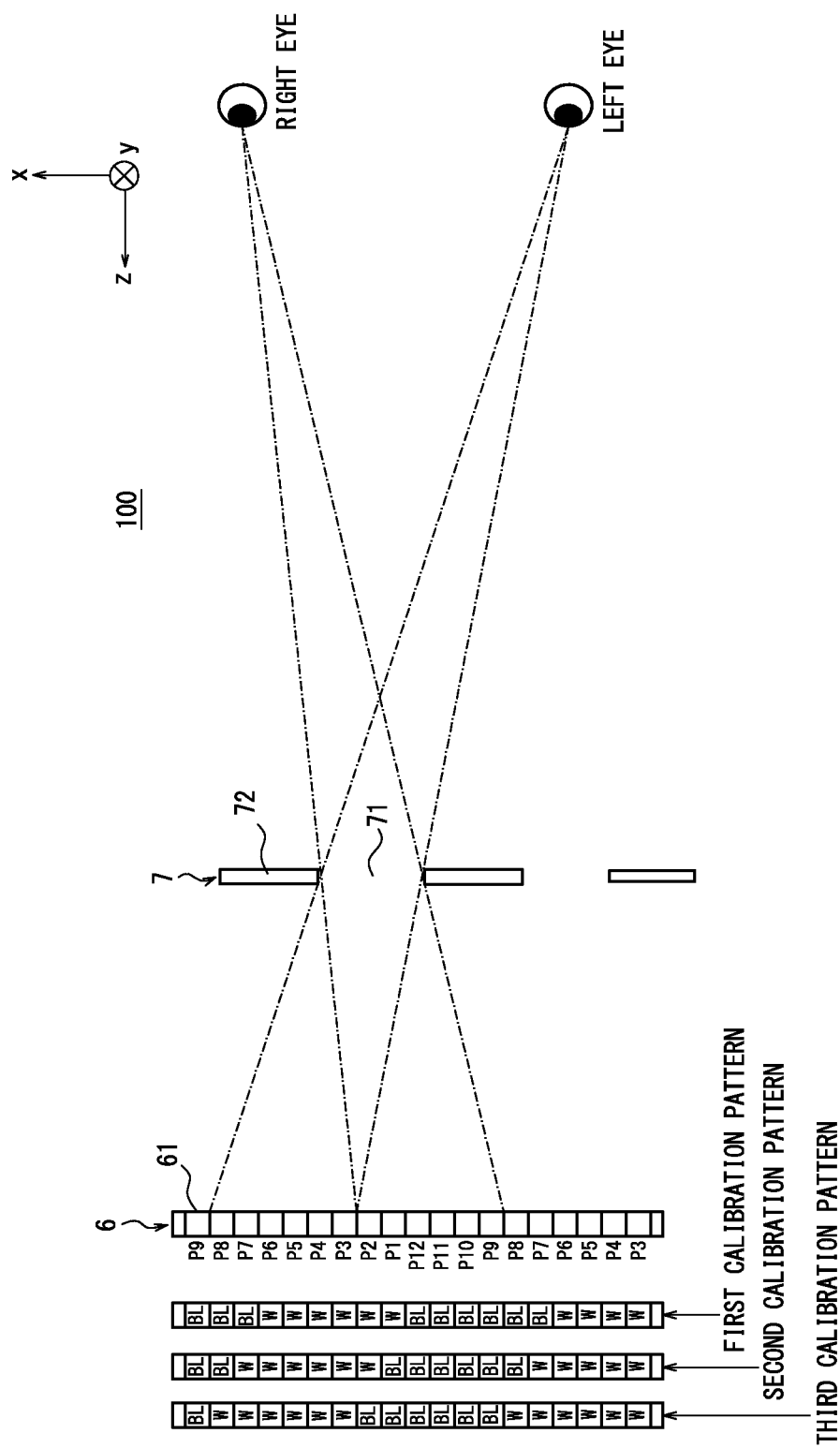
FIG. 5 is a diagram illustrating a calibration image included in an image of each eye in the first embodiment.

Hereinafter, each of the (2×n) types of calibration patterns will be described as a k-th calibration pattern (k=1 to (2×n)). As illustrated in FIG. 5, a first calibration pattern is a pattern in which the first calibration image is displayed on the subpixels P1 to P6 and the second calibration image is displayed on the subpixels P7 to P12. The second calibration pattern is a pattern in which the first calibration image is displayed on the subpixels P2 to P7 and the second calibration image is displayed on the subpixels P8 to P12, and P1. In this way, in the k-th calibration pattern, the first calibration image is displayed on n subpixels continuous in one direction from a subpixel Pk, and the second calibration image is displayed on the remaining subpixels.

Hereinafter, the first calibration image will be referred to as a white image, and the second calibration image will be referred to as a black image.

Figure 6:
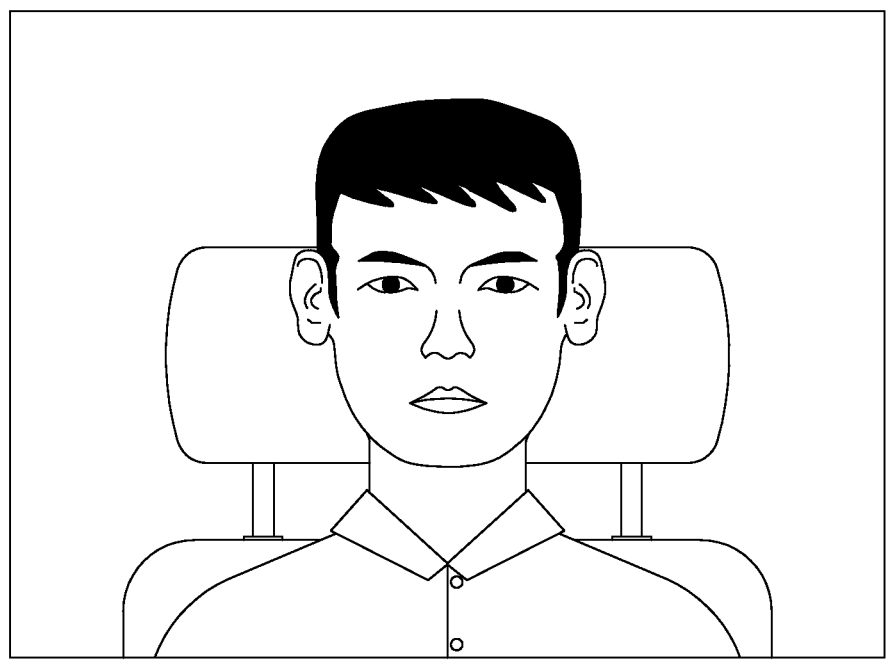
FIG. 6 is a diagram illustrating an example of a captured image generated by an imaging device.

The controller 4 extracts the cornea image of each of the left eye and the right eye of the user from the captured image as illustrated in FIG. 6, received by the communication unit 3. The method by which the controller 4 extracts the cornea image may be any method. For example, the controller 4 may extract the cornea image by pattern matching. The controller 4 may detect the image of a face of the user by pattern matching and extract the cornea image, based on the relative positional relationship between the image of the face and the image of the cornea.

The controller 4 determines one of the calibration patterns as a reference pattern, based on the cornea image of each eye in the captured image. The reference pattern is a pattern for controlling the image displayed on the display panel 6 by the controller 4 in the normal mode so that the user can view the three-dimensional image with the crosstalk reduced. In the calibration pattern determined as a reference pattern, the controller 4 causes the subpixels of the display panel 6 on which a white image was displayed, to display the left-eye image in the normal mode. In the calibration pattern determined as the reference pattern, the controller 4 causes the subpixels of the display panel 6 on which the black image was displayed, to display the right-eye image in the normal mode.

Specifically, the controller 4 extracts the central area of the cornea of each of the left eye and the right eye. The central area is an area smaller than the ellipse centered on the center of the ellipse formed by the cornea of the left eye. The central area may be, for example, an area within a rectangle having a predetermined ratio of the major axis and the minor axis of the ellipse formed by the cornea of the left eye as a long side and a short side, respectively. The controller 4 determines whether or not the image of the white image and the image of the black image are included in the central area of the cornea of each of the left eye and the right eye.

The controller 4 determines whether or not the image of the white image and the image of the black image are included in the central area of the cornea image of the right eye. More specifically, the controller 4 searches for the brightness values of the white image and the black image in the central area of the cornea image of the left eye by known image processing. The controller 4 searches for the brightness values of the white image and the black image in the central area of the cornea image of the right eye by known image processing. In this way, the controller 4 determines whether or not the image of the first calibration image and the image of the second calibration image are included in the central area of the cornea image of the left eye and the right eye, respectively.

The controller 4 causes the imaging device 1 to generate a captured image when the first calibration pattern is displayed on the display panel 6. In the example illustrated in FIG. 5, the first calibration pattern is a pattern in which a white image is displayed on the subpixels P1 to P6 and a black image is displayed on the subpixels P7 to P12. In this example, the cornea image of the left eye in the captured image includes both the image of the white image displayed in the subpixels P3 to P6 and the image of the black image displayed in the subpixels P7 to P8. The cornea image of the right eye in the captured image includes both the image of the black image displayed on the subpixels P9 to P12 and the image of the white image displayed on the subpixels P1 and P2.

Figure 7A:
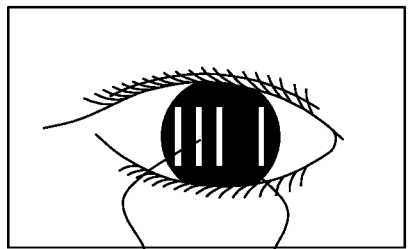
FIGS. 7A and 7B are diagrams illustrating an example of an image of each eye on which a calibration image is projected in the first embodiment.
Figure 7B:
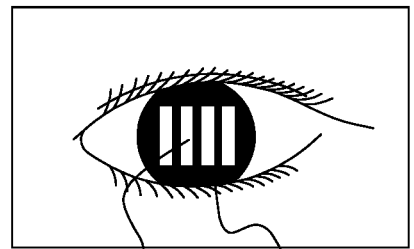

Therefore, when the first calibration pattern is displayed on the display panel 6, as illustrated in FIGS. 7A and 7B, the image of the white image and the image of the black image are included in the central area of the cornea image of each of the left eye and the right eye. Therefore, the controller 4 determines that the image of the white image and the image of the black image are included in the central area of the cornea image of the left eye and the right eye. By using this principle, the controller 4 can determine as a reference pattern of a calibration pattern in which only the image of the white image is included in the central area of the cornea image of the left eye and only the image of the black image is included in the central area of the cornea image of the right eye.

Specifically, the controller 4 displays one of the calibration patterns on the display panel 6. The controller 4 determines whether or not the image of the white image and the image of the black image are included in the central area of the cornea image of the left eye in the image. As illustrated in FIG. 7B, when determining that the image of the white image and the image of the black image are included in the central area of the cornea image of the left eye in the image, the controller 4 causes the display panel 6 to display another calibration pattern for which the determination has not been made. The controller 4 causes the display panel 6 to display another calibration pattern and repeats the same determination.

Figure 8A:
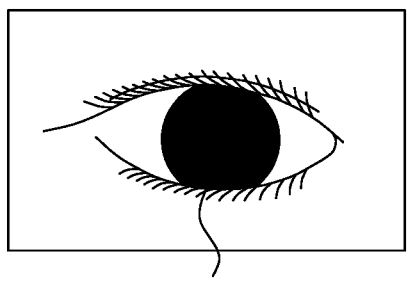
FIGS. 8A and 8B are diagrams illustrating another example of an image of each eye on which a calibration image is projected in the first embodiment.
Figure 8B:
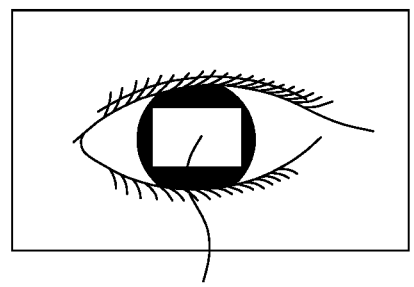

When determining that the image of the white image is included and the image of the black image is not included in the central area of the cornea image of the left eye, in the captured image as illustrated in FIG. 8B, the controller 4 determines whether or not the image of the white image and the image of the black image are included in the central area of the cornea image of the right eye. As illustrated in FIG. 8A, when determining that the image of the black image is included and the image of the white image is not included in the central area of the cornea image of the right eye, the controller 4 determines the calibration pattern when the captured image is generated as a reference pattern.

In the example illustrated in FIG. 5, the controller 4 can control the display panel 6 to display a third calibration pattern. The third calibration pattern is a pattern in which a white image is displayed on the subpixels P3 to P8 as the first calibration image and a black image is displayed on the subpixels P9 to P12, P1 and P2 as the second calibration image. At this time, the controller 4 determines that the image of the white image is included in the central area of the cornea image of the left eye and the image of the black image is not included, and the image of the black image is included in the central area of the cornea image of the right eye and the image of the white image is not included. The controller 4 determines the third calibration pattern as the reference pattern.

Normal Mode

In the normal mode, the controller 4 causes the display panel 6 to display a parallax image by using the reference pattern. Specifically, the controller 4 causes the subpixels on which a white image was displayed to display the left-eye image in the reference pattern. The controller 4 causes the subpixels on which a black image was displayed to display the right-eye image in the reference pattern.

Flow of Calibration Processing

Figure 9:
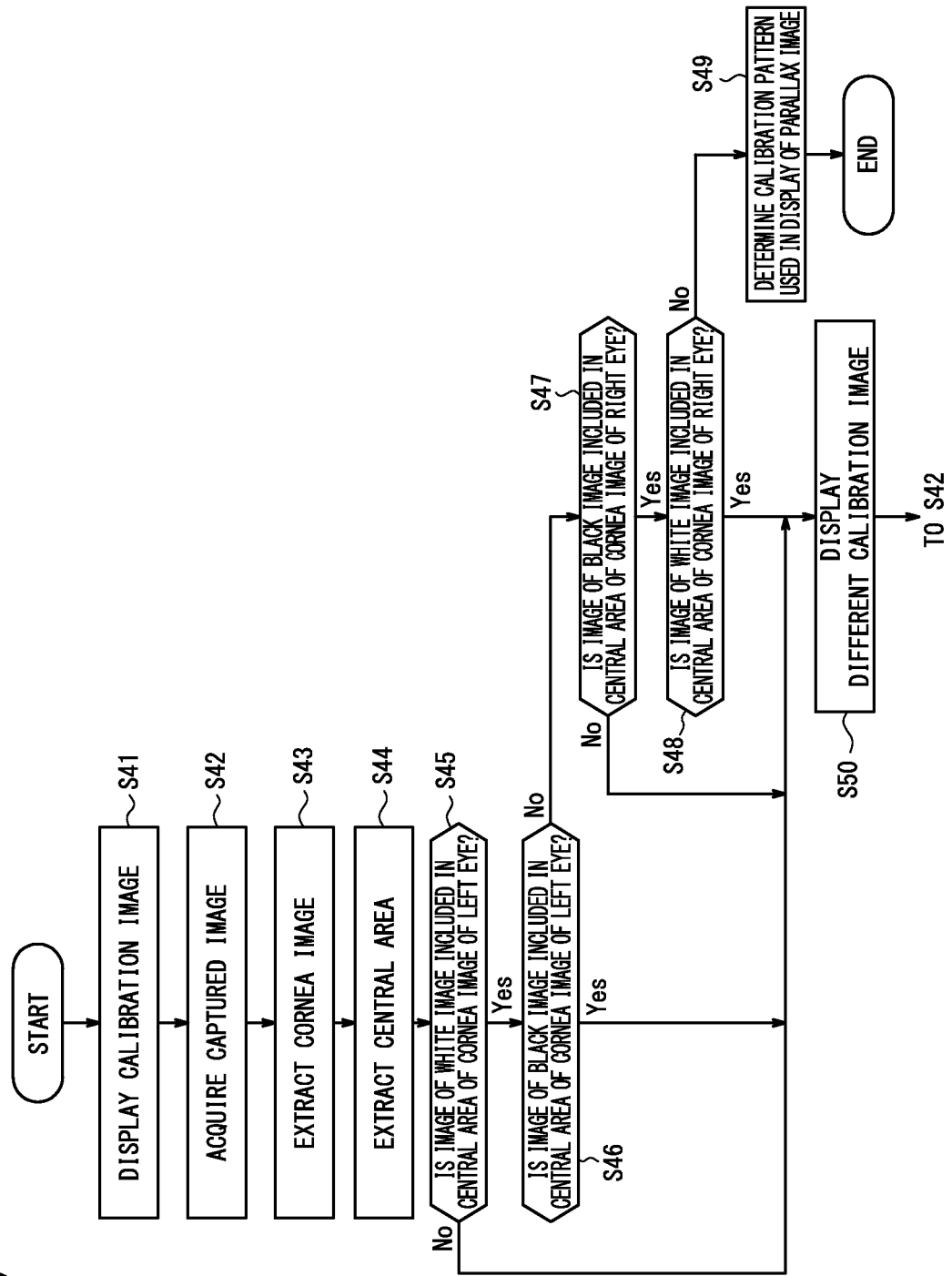
FIG. 9 is a flowchart illustrating an example of a processing flow of the three-dimensional display device according to the first embodiment.

The processing executed by the controller 4 in the first embodiment will be described in detail with reference to FIG. 9.

The controller 4 causes the display panel 6 to display one of the (2×n) types of calibration patterns (step S41).

When the calibration pattern is displayed in step S41, the controller 4 acquires the image captured by the imaging device 1 during the display of the calibration pattern and received by the communication unit 3 (step S42).

When the captured image is acquired in step S42, the controller 4 extracts the cornea images of the left eye and the right eye from the captured image acquired in step S12 (step S43).

When the cornea image is extracted in step S43, the controller 4 extracts the central area of the cornea image (step S44).

When the central area of the cornea image is extracted in step S44, the controller 4 determines whether or not the image of the white image is included in the central area of the cornea image of the left eye extracted in step S44 (step S45).

When it is determined in step S45 that the image of the white image is included in the central area of the cornea image of the left eye, the controller 4 determines whether or not the image of the black image is included in the central area of the cornea image of the left eye (step S46).

When it is determined in step S46 that the image of the black image is not included in the central area of the cornea image of the left eye, the controller 4 determines whether or not the image of the black image is included in the central area of the cornea image of the right eye (step S47).

When it is determined in step S47 that the image of the black image is included in the central area of the cornea image of the right eye, the controller 4 determines whether or not the image of the white image is included in the central area of the cornea image of the right eye (step S48).

When it is determined in step S48 that the image of the white image is not included in the central area of the cornea image of the right eye, the controller 4 determines the calibration pattern displayed in step S41 as a reference pattern (step S49).

When it is determined in step S45 that the image of the white image is not included in the central area of the cornea image of the left eye, the controller 4 displays a calibration pattern different from the calibration pattern already displayed, on the display panel 6 (step S50). When it is determined in step S46 that the image of the black image is included in the central area of the cornea image of the left eye, the controller 4 causes the display panel 6 to display a calibration pattern different from the calibration pattern already displayed (step S50). When it is determined in step S47 that the image of the black image is not included in the central area of the cornea image of the right eye, the controller 4 causes the display panel 6 to display a calibration pattern different from the calibration pattern already displayed (step S50). When it is determined in step S48 that the image of the white image is included in the central area of the cornea image of the right eye, the controller 4 displays a calibration pattern different from the calibration pattern already displayed (step S50).

When a calibration pattern different from the calibration pattern already displayed is displayed on the display panel 6 in step S50, the procedure returns to S42 and the controller 4 repeats the processing.

When a reference pattern is determined in step S49, the controller 4 ends the calibration mode, and when a start instruction of the normal mode is inputted, the controller 4 carries out display of a parallax image based on the determined reference pattern.

Second Embodiment

Subsequently, a second embodiment of the disclosure will be described with reference to drawings. The three-dimensional display system 100 according to the second embodiment includes an imaging device 1 and a three-dimensional display device 2 as in the first embodiment.

The imaging device 1 of the second embodiment is the same as the imaging device 1 of the first embodiment. The three-dimensional display device 2 of the second embodiment includes a communication unit 3, a controller 4, an irradiator 5, a display panel 6, and a parallax barrier 7, as in the first embodiment. The communication unit 3, the irradiator 5, the display panel 6, and the parallax barrier 7 are the same as those in the first embodiment. The controller 4 of the second embodiment is connected to each component of the three-dimensional display device 2 and can control each component as in the first embodiment. The controller 4 of the second embodiment is configured as a processor as in the first embodiment. The processing performed by the controller 4 of the second embodiment is different from that of the first embodiment, and the processing will be described in detail below.

The calibration images of the second embodiment are the same as the calibration image of the first embodiment. Hereinafter, for description, the first calibration image will be referred to as a white image, and the second calibration image will be referred to as a black image.

Calibration Mode

Figure 10:
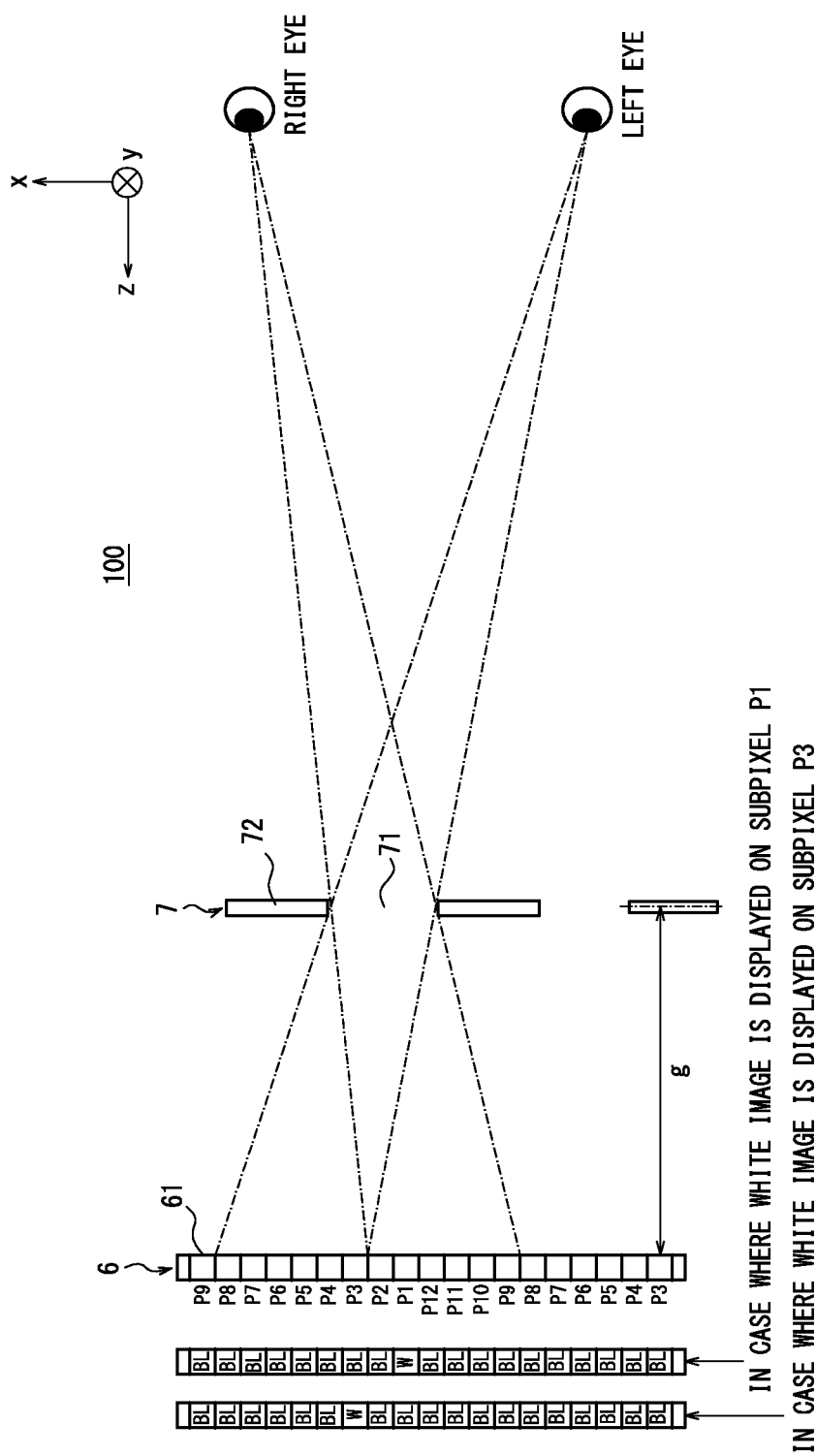
FIG. 10 is a diagram illustrating a calibration image projected on each eye in a second embodiment.

In a calibration mode, the controller 4 causes the display panel 6 to display a calibration pattern. Specifically, as illustrated in FIG. 10, the controller 4 causes any one of the (2×n) subpixels included in each subpixel group to display a white image. The controller 4 causes the subpixels that do not display a white image among the (2×n) subpixels included in each subpixel group to display a black image.

The controller 4 extracts the cornea images of the left eye and the right eye in the captured image received by the communication unit 3. The method by which the controller 4 extracts the cornea images is the same as that in the first embodiment.

The controller 4 extracts the central area of the cornea of each of the left and right eyes. The controller 4 determines whether or not the image of a first calibration image is included in the central area of the cornea of each of the left eye and the right eye.

When extracting the central area of the cornea image, the controller 4 determines a left display subpixel, a right display subpixel, a left parallax subpixel (first parallax subpixel), and a left parallax subpixel (second parallax subpixel), based on the calibration image included in the central area. The left display subpixel is a subpixel that is visible with the left eye. The right display subpixel is a subpixel that is visible with the right eye. The left parallax subpixel is a subpixel that is visible with the left eye and not visible with the right eye. The right parallax subpixel is a subpixel that is visible with the right eye and not visible with the left eye.

Figure 11A:
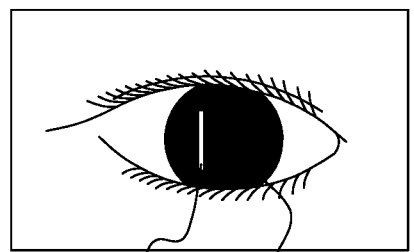
FIGS. 11A and 11B are diagrams illustrating an example of an image of each eye on which a calibration image is projected in the second embodiment.
Figure 11B:
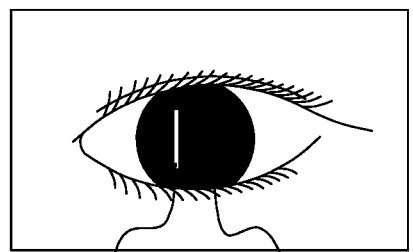
Figure 12A:
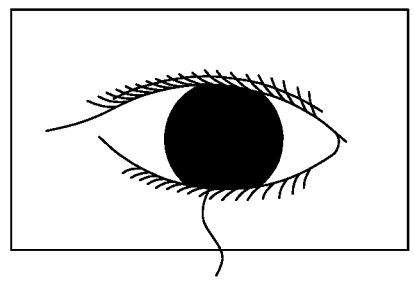
FIGS. 12A and 12B are diagrams illustrating another example of an image of each eye on which a calibration image is projected in the second embodiment.
Figure 12B:
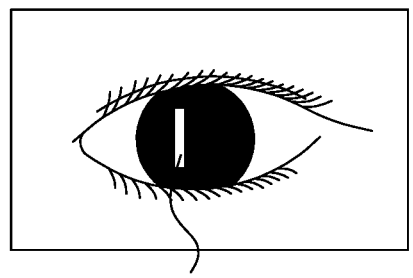

Specifically, the controller 4 determines whether or not the image of the white image is included in the central area of the cornea image of the left eye. When determining that the image of the white image is included in the central area of the cornea image of the left eye as illustrated in FIGS. 11B and 12B, the controller 4 determines that the subpixel displaying the white image is a left display subpixel.

When determining that the image of the white image is included in the central area of the cornea image of the left eye, the controller 4 determines whether or not the image of the white image is included in the central area of the cornea image of the right eye. As illustrated in FIG. 11A, when determining that the image of the white image is included in the central area of the cornea image of the right eye, the controller 4 determines that the subpixel displaying the white image is a left display subpixel and a right display subpixel. As illustrated in FIG. 12A, when determining that the image of the white image is not included in the central area of the cornea image of the right eye, the controller 4 determines that the subpixel displaying the white image is a left parallax subpixel.

The controller 4 determines whether or not the image of the white image is included in the central area of the cornea image of the right eye. As illustrated in FIG. 11A, when determining that the image of the white image is included in the central area of the cornea image of the right eye, the controller 4 determines that the subpixel displaying the white image is a right display subpixel.

When determining that the image of the white image is not included in the central area of the cornea image of the right eye, the controller 4 determines whether or not the image of the white image is included in the central area of the cornea image of the left eye. When determining that the image of the white image is not included in the central area of the cornea image of the left eye, the controller 4 determines that the subpixel displaying the white image is a right parallax subpixel.

When determining that the image of the white image is included in neither the central area of the cornea image of the left eye nor the central area of the cornea image of the right eye, the controller 4 determines that the subpixel displaying the white image is neither a left display subpixel nor a right display subpixel.

Subsequently, the controller 4 causes any of the subpixels for which the above determination has not been made to display a white image and causes the subpixels not displaying a white image at this time to display a black image. Then, the controller 4 also determines whether the subpixel displaying the white image is a left display subpixel or a right display subpixel. Similarly, the controller 4 determines whether the subpixel displaying the white image is a left parallax subpixel or a right parallax subpixel. The controller 4 repeats these processing for all the subpixels included in the subpixel group Pg. When the controller 4 ends the determination for each of all the subpixels, the controller 4 ends the calibration mode.

In the example illustrated in FIG. 10, when the controller 4 causes the subpixel P1 to display a white image and causes the subpixels P2 to P12 to display a black image as the second calibration image, a white image is included within the central area of the cornea image of the right eye. Therefore, the controller 4 determines that the subpixel P1 is a right display subpixel. When the controller 4 causes the subpixel P3 to display a white image and causes the subpixels P1, P2, and P4 to P12 to display a white image, a white image is included within the central area of the cornea image of the left eye. Therefore, the controller 4 determines that the subpixel P3 is a left display subpixel.

Normal Mode

In a normal mode, the controller 4 causes the left parallax subpixel determined in the calibration mode to display a left-eye image. In the normal mode, the controller 4 causes the right parallax subpixel determined in the calibration mode to display a right-eye image. The controller 4 may cause the subpixel which is the left display subpixel determined in the calibration mode and is the right display subpixel, to display a black image.

Flow of Calibration Processing

Figure 13:
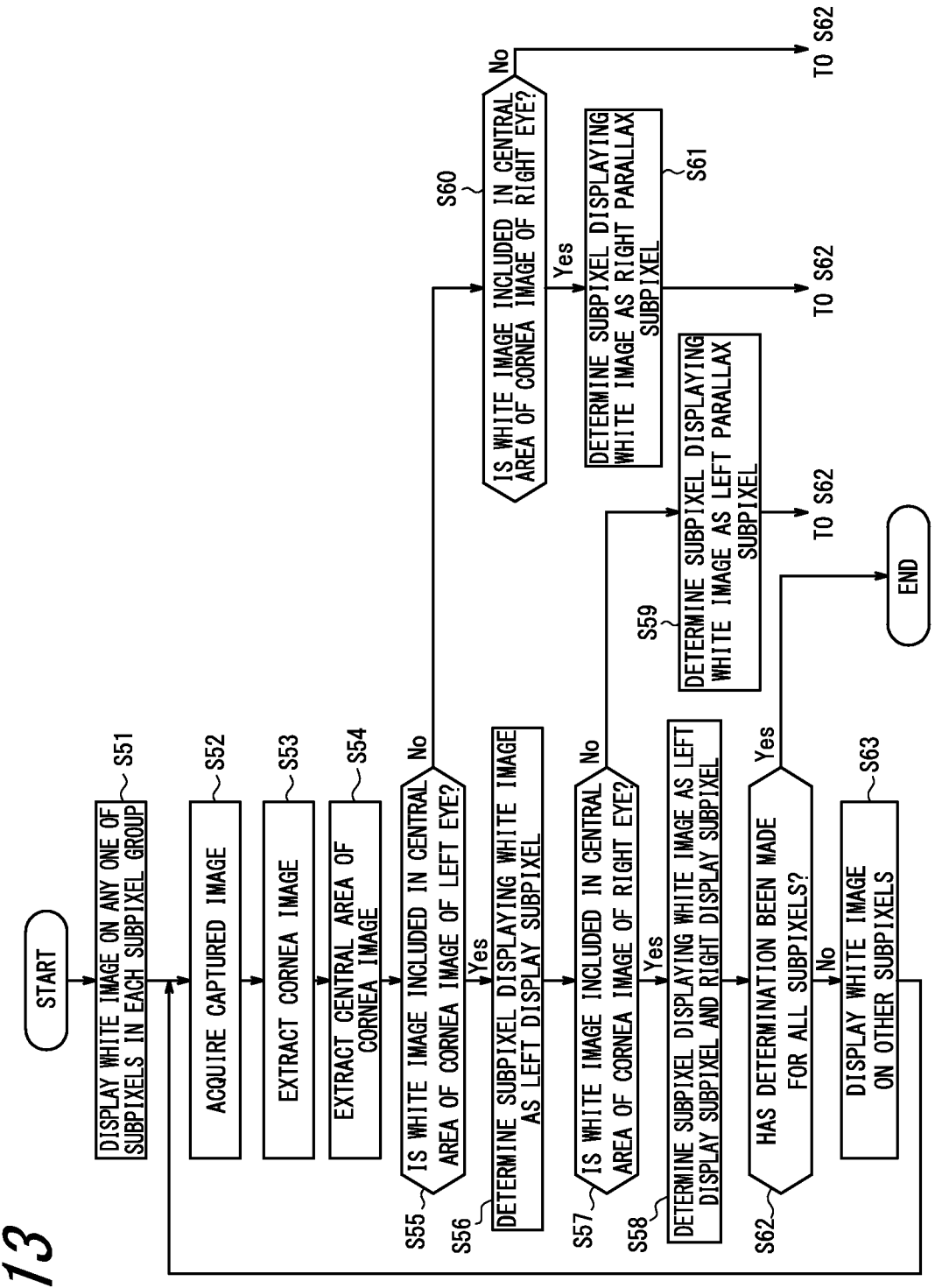
FIG. 13 is a flowchart illustrating an example of a processing flow of a three-dimensional display device according to the second embodiment.

The processing executed by the controller 4 in the second embodiment will be described in detail with reference to FIG. 13.

The controller 4 causes any one of the subpixels in each subpixel group Pg, to display a white image and causes the subpixels other than the subpixel on which the white image is displayed, to display a black image (step S51).

When a white image and a black image are displayed in step S51, the controller 4 acquires the image captured by the imaging device 1 during the display and received by the communication unit 3 (step S52).

When the captured image is acquired in step S52, the controller 4 extracts the cornea images of the left eye and the right eye from the captured image acquired in step S52 (step S53).

When the cornea image is extracted in step S53, the controller 4 extracts the central area of the cornea image (step S54).

When the central area of the cornea image is extracted in step 54, the controller 4 determines whether or not a white image is included in the central area of the cornea image of the left eye (step S55).

In step S55, when it is determined that the image of a white image is included in the central area of the cornea image of the left eye, the controller 4 determines that the subpixel displaying the white image is a left display subpixel (step S56).

The controller 4 determines whether or not the image of the white image is included in the central area of the cornea image of the right eye (step S57).

In step S57, when it is determined that the image of the white image is included in the central area of the cornea image of the right eye, the controller 4 determines the subpixel displaying the white image as the left subpixel and the right subpixel (step S58).

When it is determined in step S57 that the image of the white image is not included in the central area of the cornea image of the right eye, the controller 4 determines that the subpixel displaying the white image is a left parallax subpixel (step S59).

When it is determined in step S55 that the image of the white image is not included in the central area of the cornea image of the left eye, the controller 4 determines whether or not the image of the white image is included in the central area of the cornea image of the right eye (step S60).

When it is determined in step S60 that the image of the white image is included in the central area of the cornea image of the right eye, the controller 4 determines that the subpixel displaying the white image is a right parallax subpixel (step S61).

When the processing of steps S59 to S61 ends, the controller 4 determines whether or not the determination for all the subpixels has been made (step S62).

When it is determined in step S62 that the determination has not been made for all the subpixels, the controller 4 causes the other subpixels to display a white image (step S63).

When a white image is displayed in the other subpixels in step S63, the procedure returns to step S52 and the controller 22 repeats the processing.

When it is determined in step S62 that the determination has been made for all the subpixels, the controller 4 ends the calibration mode, and when a start instruction of the normal mode is inputted, the controller 4 carries out display of a parallax image based on the determination.

As the controller 4 according to the above-described embodiment, an information processing device such as a computer can be adopted. Such an information processing device can be realized by storing a program describing processing contents that realize each function of the controller 4 according to the embodiments in the memory of the information processing device and reading and executing the program by a processor of the information processing device. The controller 4 may be configured to read the program from a non-transitory computer-readable medium and implement the program. The non-transitory computer-readable medium includes, but are not limited to, magnetic storage media, optical storage media, photomagnetic storage media, and semiconductor storage media. Magnetic storage media include magnetic disks, hard disks, and magnetic tapes. Optical storage media include optical discs such as CD (Compact Disc), DVD, and Blu-ray disc (Blu-ray (registered trademark) Disc). Semiconductor storage media include a ROM (Read Only Memory), an EEPROM (Electrically Erasable Programmable Read-Only Memory), and a flash memory.

As described above, in the first embodiment, the controller 4 determines, as a reference pattern, a calibration image displayed when an image is captured in which the white image is included in the cornea image of the left eye and the white image is not included in the cornea image of the right eye, and the black image is included in the cornea image of the right eye and the black image is not included in the cornea image of the left eye. The controller 4 controls the parallax image which is to be displayed on the display panel 6, based on the reference pattern in the normal mode. Therefore, the controller 4 causes the subpixels on which a white image is displayed to display the left-eye image, and causes the subpixels on which a black image is displayed to display the right-eye image, and the user views the left-eye image with the left eye and views the right-eye image with the right eye. Therefore, the user can properly view a three-dimensional image.

In the first embodiment, the controller 4 determines whether or not a white image and a black image are included in the central area of the image of each eye. Humans tend to recognize the image of an object projected on the central area more strongly than the image of an object projected on the peripheral area of the cornea. Therefore, the controller 4 determines a calibration pattern based on the white image and the black image projected on the central area. Therefore, in the normal mode, the user can view the left-eye image in the central area of the left eye and view the right-eye image in the central area of the right eye. In such a configuration, since the right-eye image may be viewed in the peripheral area of the left eye of the user, but it is difficult to be strongly recognized, the right-eye image viewed in the peripheral area of the left eye has little effect on the occurrence of crosstalk. By calibrating in this way, the area on the captured image in which the controller 4 determines whether or not each of a white image and a black image is included becomes smaller. Therefore, the processing load of the controller 4 can be reduced.

In the second embodiment, the controller 4 displays an image on the display panel 6. The controller 4 determines a left display subpixel and a right display subpixel based on the cornea images of different parts of the calibration image in the captured image that are viewed with the left eye and the right eye of the user. For this reason, in the calibration mode before the three-dimensional display device 2 displays a three-dimensional image, the user does not need to confirm that a white image and a black image are viewed with the left eye and the right eye of the user, respectively. Therefore, the user's effort required for the setting can be reduced.

In the second embodiment, the controller 4 determines a left parallax subpixel that is visible with the left eye and not visible with the right eye, and a right parallax subpixel that is visible with the right eye and not visible with the left eye. Therefore, the controller 4 causes the left parallax subpixel to display the left-eye image and causes the right parallax subpixel to display the right-eye image so that the user views the left-eye image only with the left eye and view the right-eye image only with the right eye. Therefore, the user can view a three-dimensional image with the crosstalk reduced.

In the second embodiment, the controller 4 determines whether or not a white image is included in the central area of the image of each eye. Therefore, the controller 4 determines a left display subpixel, a right display subpixel, a left parallax subpixel, and a right parallax subpixel, based on the white image projected on the central area. Therefore, in the normal mode, the user can view the left-eye image in the central area of the left eye and view the right-eye in the central area of the right eye. Therefore, the processing load of the controller 4 can be reduced while reducing the influence on the occurrence of crosstalk.

Although the above embodiments have been described as representative examples, it will be apparent to those skilled in the art that many modifications and substitutions can be made within the spirit and scope of the invention. Therefore, the invention should not be construed as limiting by the embodiments described above, and various modifications and changes can be made without departing from the claims. For example, it is possible to combine the plurality of constituent blocks described in the embodiments and the examples into one, or to divide one constituent block.

For example, in the above-described embodiments, the first calibration image may be a white image and the second calibration image may be a black image, but the invention is not limited thereto. For example, the first calibration image may be a black image and the second calibration image may be a white image. The first calibration image and the second calibration image only have different values indicating the characteristics of the images so that the part of the captured image of the eyes that include the first calibration image and the second calibration image can be distinguished. For example, the first calibration image may be a red image and the second calibration image may be a green image.

For example, in the second embodiment, the controller 4 determines whether or not a white image is included in the central area of the cornea image of the left eye and then determines whether or not a white image is included in the central area of the cornea image of the right eye, but the invention is not limited thereto. For example, the controller 4 may determine whether or not a white image is included in the central area of the cornea image of the right eye and then determine whether or not a white image is included in the central area of the cornea image of the left eye.

Figure 14:
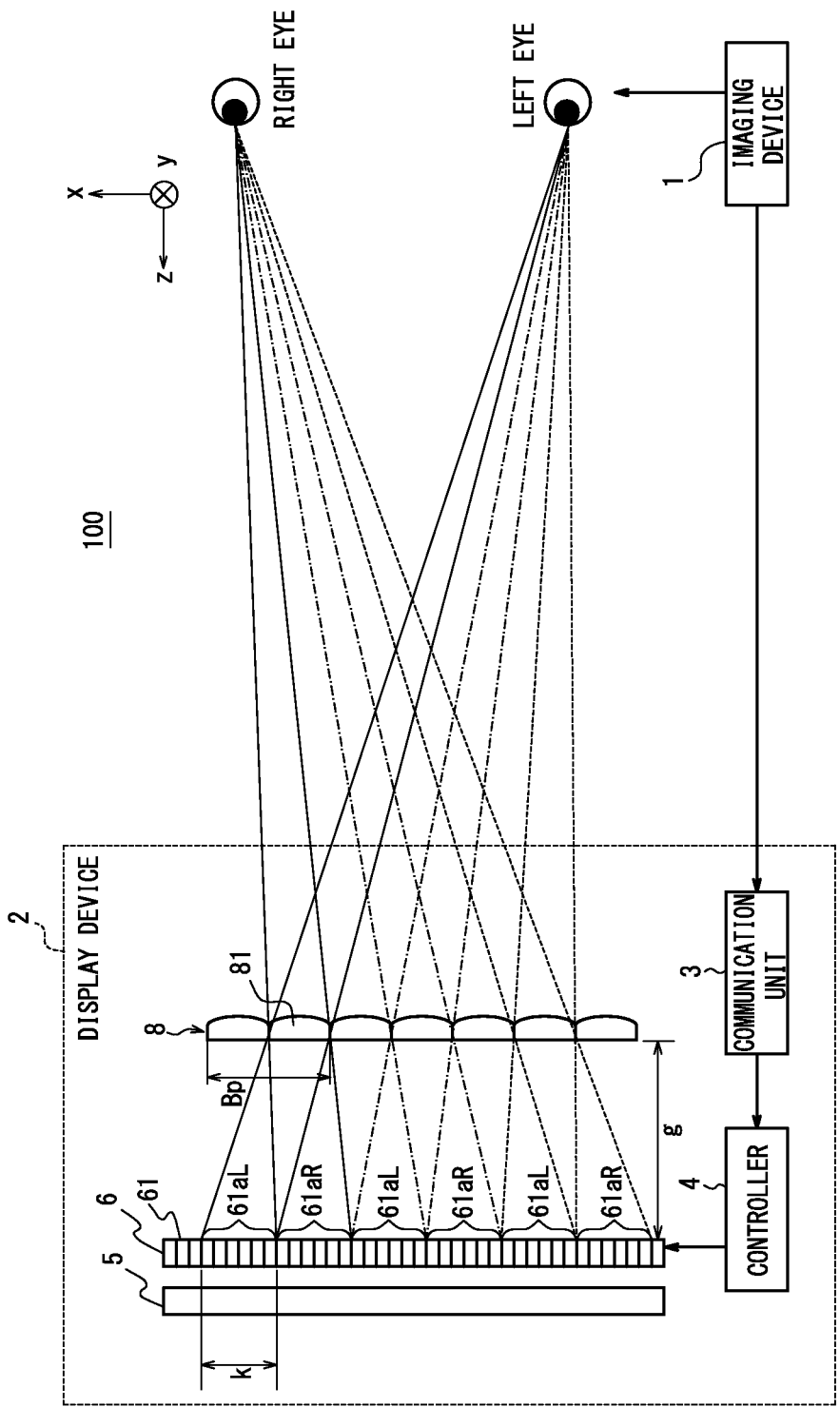
FIG. 14 is a diagram of a schematic configuration of the three-dimensional display device when an optical element is a lenticular lens.

In each of the above-described embodiments, the three-dimensional display device 2 includes the parallax barrier 7, but the invention is not limited to this. For example, the three-dimensional display device 2 may include a lenticular lens 8 as an optical element. In this case, the lenticular lens 8 is configured by arranging cylindrical lenses 81 extending in the vertical direction in the horizontal direction on a plane as illustrated in FIG. 14. Similar to the parallax barrier 7, the lenticular lens 8 propagates the image light emitted from the subpixels in a left visible region 61aL to the position of the right eye of the user and propagates the image light emitted from the subpixels in a visible region 61aR to the position of the left eye of the user.

Figure 15:
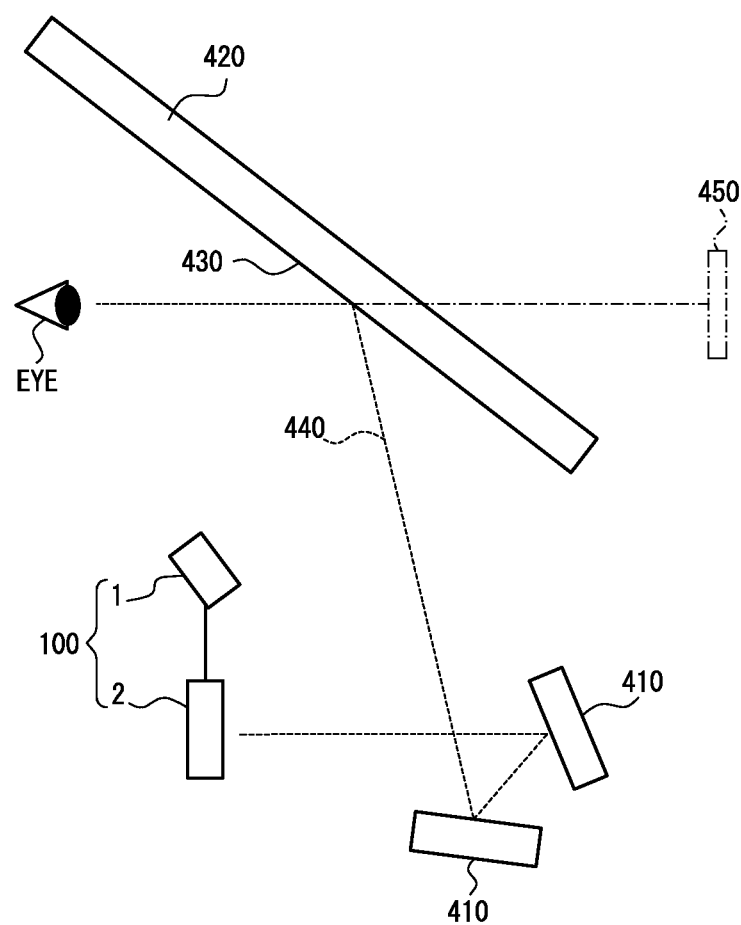
FIG. 15 is a diagram illustrating an example of a HUD equipped with the three-dimensional display system illustrated in FIG. 1.
Figure 16:
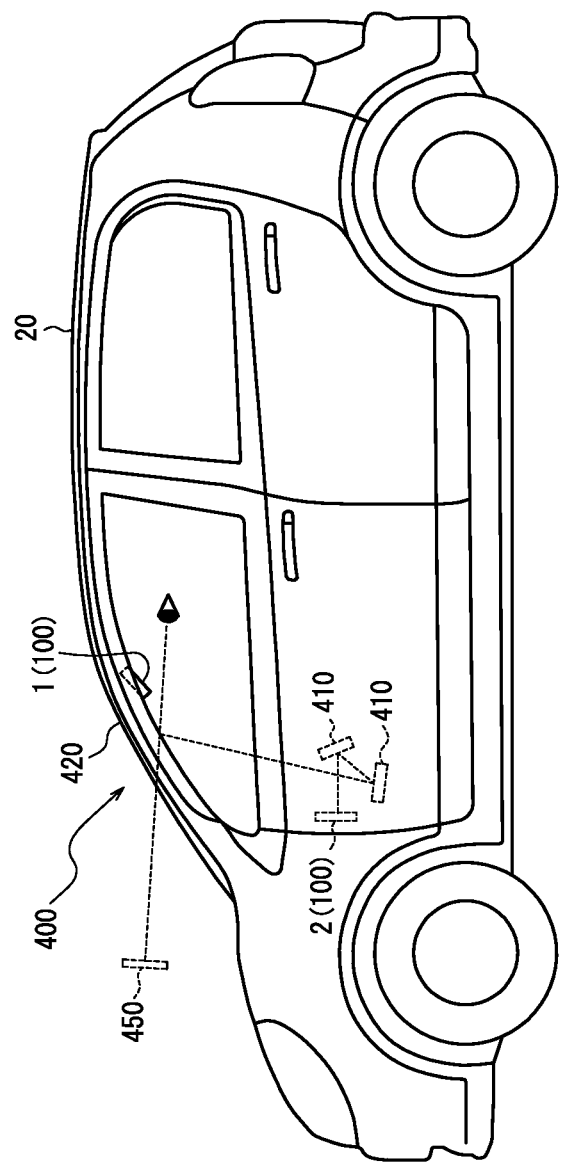
FIG. 16 is a diagram illustrating an example of a moving object equipped with the HUD illustrated in FIG. 15.

As illustrated in FIG. 15, the three-dimensional display system 100 can be mounted on a head-up display system 400. The head-up display system 400 is also called an HUD (Head Up Display) 400. The HUD 400 includes the three-dimensional display system 100, an optical member 410, and a projected member 420 including a projected surface 430. The HUD 400 causes the image light emitted from the three-dimensional display system 100 to reach the projected member 420 via the optical member 410. The HUD 400 causes the image light reflected by the projected member 420 to reach the left eye and the right eye of the user. That is, the HUD 400 advances the image light from the three-dimensional display system 100 to the left eye and the right eye of the user along an optical path 440 indicated by the broken line. The user can view the image light that has arrived along the optical path 440 as a virtual image 450.

As illustrated in FIG. 14, the HUD 400 including the three-dimensional display system 100 may be mounted on the moving object 20. A part of the configuration of the HUD 400 may be shared with other devices and parts included in the moving object 20. For example, in the moving object 20, a windshield may also be used as the projected member 420. In the case where a part of the configuration is also shared with other devices or parts in the moving object 20, the other configuration can be referred to as an HUD module or a three-dimensional display component. "Moving objects" in the disclosure include vehicles, ships, and aircraft. "Vehicles" in the disclosure include, but are not limited to, automobiles and industrial vehicles and may include railway vehicles, living vehicles, and fixed-wing aircraft traveling on runways. Automobiles include, but are not limited to, passenger cars, trucks, buses, motorcycles, trolley buses, and the like and may include other vehicles traveling on the road. The industrial vehicles include industrial vehicles for agriculture and construction. The industrial vehicles include, but are not limited to, forklifts and golf carts. The industrial vehicles for agriculture include, but are not limited to, tractors, tillers, transplanters, binders, combines, and lawnmowers. The industrial vehicles for construction include, but are not limited to, bulldozers, scrapers, excavators, crane trucks, dump trucks, and road rollers. The vehicles include those that run manually. The classification of vehicles is not limited to those described above. For example, an automobile may include an industrial vehicle capable of traveling on a road and the same vehicle may be included in a plurality of classifications. The ships in the disclosure include marine jets, boats, and tankers. The aircraft in the disclosure include fixed-wing aircraft and rotary-wing aircraft.

REFERENCE SIGNS LIST

1: Imaging device
2: Three-dimensional display device
3: Communication unit
4: Controller
5: Irradiator
6: Display panel
7: Parallax barrier
20: Moving object
61: Active area
61aL: Left visible region
61aR: Right visible region
71: Dimming region
72: Light-transmitting region
100: Three-dimensional display system
400: Head-up display system
410: Optical member
420: Projected member
440: Optical path
450: Virtual image
Pg: Subpixel group
P1 to P12: Subpixel

The invention claimed is:

1. A three-dimensional display device, comprising:
a display panel configured to display an image;
an optical element configured to define a propagation direction of image light emitted from the display panel;
a controller configured to control an image which is to be displayed on the display panel; and
a communication unit configured to receive a captured image of first eye and second eye different from the first eye, of a user,
when a pattern of display positions on the display panel of an image that is to be viewed with the first eye and an image that is to be viewed with the second eye is defined as a calibration pattern,
the controller being configured so that a plurality of calibration patterns are displayed on the display panel, and that, based on cornea images of different parts of each of the calibration patterns in the captured image that are viewed with the first eye and the second eye of the user, respectively, a reference pattern as a reference for displaying a three-dimensional image from the plurality of calibration patterns is determined.

2. The three-dimensional display device according to claim 1, wherein
the controller is configured so that a calibration pattern of the plurality of calibration patterns where in the cornea image of the first eye, the first calibration image is included and the second calibration image is not included and in the cornea image of the second eye, the second calibration image is included and the first calibration image is not included, is determined as the reference pattern.

3. The three-dimensional display device according to claim 1, wherein
the controller is configured to cause a subpixel in which a first calibration image is displayed in the reference pattern, to display a first image that is to be viewed with the first eye and cause a subpixel in which a second calibration image is displayed in the reference pattern, to display a second image that is to be viewed with the second eye.

4. A head-up display system, comprising:
a three-dimensional display device comprising
    a display panel configured to display an image,
    an optical element configured to define a propagation direction of image light emitted from the display panel,
    a controller configured to control an image which is to be displayed on the display panel, and
    a communication unit configured to receive a captured image of first eye and second eye different from the first eye, of a user,
    when a pattern of display positions on the display panel of an image that is to be viewed with the first eye and an image that is to be viewed with the second eye, is defined as a calibration pattern, the controller being configured so that a plurality of calibration patterns are displayed on the display panel and that, based on cornea images of different parts of each of the calibration patterns in the captured image that are viewed with the first eye and the second eye of the user, respectively, a reference pattern as a reference for displaying a three-dimensional image from the plurality of calibration patterns is determined; and
an optical member configured to reflect the image light emitted from the three-dimensional display device, toward the first eye or the second eye.

5. A moving object, comprising:
a head-up display system comprising
    a three-dimensional display device comprising
        a display panel configured to display an image,
        an optical element configured to define a propagation direction of image light emitted from the display panel,
        a controller configured to control an image which is to be displayed on the display panel, and
        a communication unit configured to receive a captured image of first eye and second eye different from the first eye, of a user,
        when a pattern of display positions on the display panel of an image that is to be viewed with the first eye and an image that is to be viewed with the second eye, is defined as a calibration pattern, the controller being configured so that a plurality of calibration patterns are displayed on the display panel and that, based on cornea images of different parts of each of the calibration patterns in the captured image that are viewed with the first eye and the second eye of the user, respectively, a reference pattern as a reference for displaying a three-dimensional image from the plurality of calibration patterns is determined; and
    an optical member configured to reflect the image light emitted from the three-dimensional display device, toward the first eye or the second eye.

6. A non-transitory computer-readable medium storing a program executed by a three-dimensional display device comprising a display panel configured to display an image, an optical element configured to define a propagation direction of image light emitted from the display panel, a controller configured to control an image which is to be displayed on the display panel, and a communication unit configured to receive a captured image of first eye and second eye different from the first eye, of a user,
    when a pattern of display positions on the display panel of an image that is to be viewed with the first eye and an image that is to be viewed with the second eye, is defined as a calibration pattern, the controller causing the display panel to display a plurality of calibration patterns, and based on cornea images of different parts of each of the calibration patterns in the captured image that are viewed with the first eye and the second eye of the user, respectively, the controller determining a reference pattern as a reference for displaying a three-dimensional image from the plurality of calibration patterns.

* * * * *